United States Patent
Atwood et al.

(10) Patent No.: US 8,745,390 B1
(45) Date of Patent: Jun. 3, 2014

(54) MUTUAL AUTHENTICATION AND KEY EXCHANGE FOR INTER-APPLICATION COMMUNICATION

(71) Applicant: Google Inc., Mountain View, CA (US)

(72) Inventors: Scott Roy Atwood, Campbell, CA (US); Colin Albright McDonough, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/079,240

(22) Filed: Nov. 13, 2013

(51) Int. Cl.
*H04L 9/32* (2006.01)
*H04L 9/00* (2006.01)

(52) U.S. Cl.
CPC ............... *H04L 9/3273* (2013.01); *H04L 9/00* (2013.01)
USPC .......................................... 713/169; 713/171

(58) Field of Classification Search
CPC ....... H04L 9/00; H04L 9/3228; H04L 9/3263; H04L 9/3273
See application file for complete search history.

(56) References Cited

U.S. PATENT DOCUMENTS

| | | | |
|---|---|---|---|
| 6,782,403 B1 * | 8/2004 | Kino et al. ............................ | 1/1 |
| 8,429,630 B2 * | 4/2013 | Nickolov et al. ............. | 717/148 |
| 2011/0173450 A1 * | 7/2011 | Knobbe et al. ................ | 713/171 |
| 2012/0159575 A1 * | 6/2012 | Fukui et al. ....................... | 726/3 |

\* cited by examiner

*Primary Examiner* — Cordelia Zecher
*Assistant Examiner* — Trang Doan
(74) *Attorney, Agent, or Firm* — Johnson, Marcou & Isaacs, LLC

(57) ABSTRACT

A requesting application transmits a session key request comprising request parameters to an application authentication system, which generates a random nonce and current timestamp, calculates a session key, and transmits the session key and session key parameters to the requesting application. The requesting application creates a pasteboard, generates a random challenge, calculates an output of a function with the random challenge as input, posts the output on the pasteboard, launches an invited application, and transmits the session key parameters and the pasteboard name to the invited application with which the user initiates an authentication session by providing credentials. The invited application requests a session key from the application authentication system, which confirms the authentication session, calculates a second session key, and transmits it to the invited application, which accesses the pasteboard, determines the random challenge, and posts the function output at an expected value. The requesting application confirms the output.

20 Claims, 7 Drawing Sheets

MUTUAL AUTHENTICATION AND KEY EXCHANGE FOR INTER-APPLICATION COMMUNICATION

TECHNICAL FIELD

This disclosure relates generally to an inter-application communication system, and more particularly to methods and systems that provide mutual authentication and cryptographic key exchange between two service applications resident on a user computing device.

BACKGROUND

Merchants and application developers create service applications that allow users to initiate service requests. Depending on the type of service that a service application provides, the service application may need to communicate with other service applications to complete a service request. Also, secure communication between service applications is important for communication of sensitive data, such as payment information or personal identification information.

Currently, some user computing device operating environments are constrained in that service applications operating in the foreground of the operating environment may not communicate directly with service applications operating in the background. To communicate in this operating environment, a first service application launches a second service application into the foreground using a uniform resource locator (URL), and the service applications communicate information indirectly via a short-term data storage, such as a pasteboard, to which the service applications have mutual access. Though the second service application is provided with the identity of the first service application when it is launched via URL, the current method is limited in that the first service application does not have certainty that the receiving service application is the intended second service application, as it is possible for two or more service applications on a user computing device to have a common URL.

SUMMARY

In certain example aspects described herein, a method for cryptographic key exchange and mutual authentication between two service applications comprises transmitting, by a requesting application, a session key request comprising request parameters to an application authentication system. The application authentication system generates a random nonce, generates a current timestamp, and calculates a session key based at least in part on the request parameters, the current timestamp, and the random nonce. The application authentication system transmits the session key and session key parameters to the requesting application. The requesting application creates a pasteboard. The requesting application generates a random challenge and calculates the output of a session key function with the random challenge as input, posting the session key function result on the pasteboard. The requesting application launches an invited application and transmits the session key parameters and the pasteboard name to an invited application. The invited application requests authentication credentials from a user. The user initiates an authentication session with the application authentication system by providing authentication credentials to the invited application.

The invited application transmits a session key request comprising request parameters and the session key parameters to the application authentication system. The application authentication system verifies that the user is in a valid authentication session, calculates a second session key based at least in part on the request parameters and the session key parameters, and transmits the second session key to the invited application. The invited application accesses the pasteboard and determines the random challenge using the posted session key function result from the pasteboard and the session key function. The invited application calculates an expected value based on the second session key and the random challenge and posts the expected value on the pasteboard. The requesting application confirms the expected value using the session key function.

In certain other example aspects described herein, a system and a computer program product for cryptographic key exchange and mutual authentication between two service applications are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
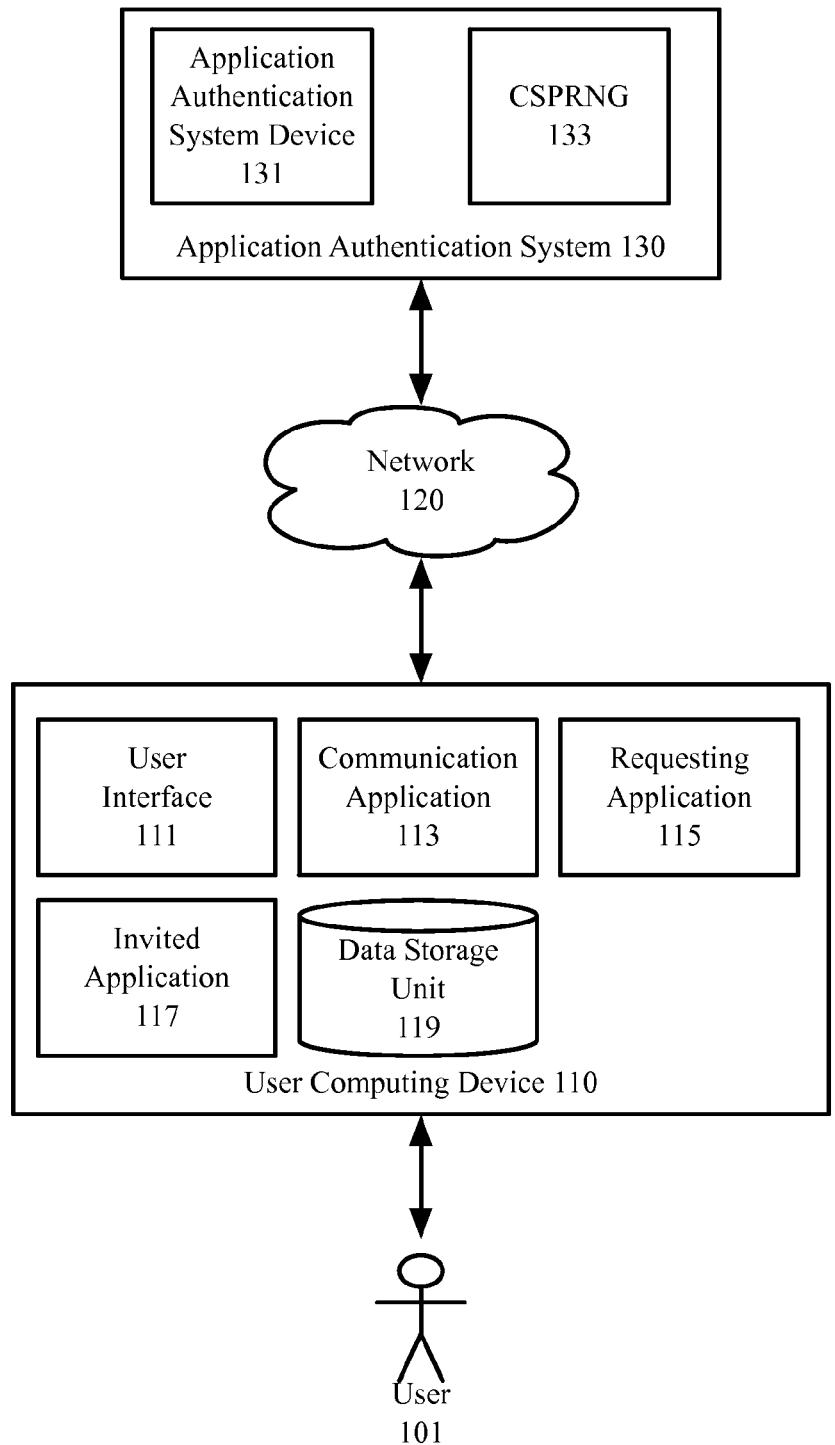
FIG. 1 is a block diagram depicting an inter-application authentication and cryptographic key exchange system, in accordance with certain example embodiments.

The example embodiments described herein provide computer-implemented techniques for establishing mutual authentication and cryptographic key exchange for inter-application communication on a mobile user computing device operating system. In an example embodiment, the mobile user computing device enables a requesting application in the foreground to launch an invited application in the background and communicate with the invited application over a pasteboard. However, the requesting application is not innately able to authenticate that the intended invited application was launched or that any received communications over the pasteboard are from the invited application. In an example embodiment, the requesting application on a user computing device launches the invited application on the same user computing device. The requesting application requests a session key from an application authentication system affiliated with the invited application. The requesting application creates a pasteboard and transmits session key parameters to the invited application via the pasteboard. The user initiates an authentication session with the application authentication system via the invited application, enabling the invited application to obtain the session key from the application authentication system using the received session key parameters. The invited application then sends a message over the pasteboard using the session key, which enables the requesting application to authenticate the invited application.

In an example, a user accesses a merchant application on a user computing device to make a purchase. To complete the transaction, the merchant application communicates with the user's digital wallet application module, the invited application. Continuing with this example, to establish secure communication between the two applications, an application authentication system (the entity which manages the digital wallet application module) creates a session key for the merchant application. The digital wallet application module receives key parameters that the merchant application posts to a pasteboard and the application authentication system facilitates the reconstruction of that key after obtaining user authorization. Receiving a communication from the digital wallet application module via the pasteboard, the merchant application verifies the digital wallet application module and is able to securely receive payment information over the pasteboard.

A requesting application transmits a session key request comprising request parameters to an application authentication system. In an example embodiment, the request parameters comprise the requesting application name, an invited application name, and a user computing device ID. For example, merchant application named "A" requests a session key from the application authentication system to communicate with a digital wallet application module named "B" on a user computing device named "C." The request parameters would comprise {A,B,C}. In an example embodiment, the application authentication system manages the invited application. For example, the user has an online digital wallet account with the application authentication system. In this example, the user downloads onto a user computing device a digital wallet application module, which is distributed by the application authentication system. In another example embodiment, the requesting application generates its own session key and makes a request for the application authentication system to encrypt the session key with a public key.

The application authentication system receives the session key request. In an example embodiment, the application authentication system is a remote server and the session key request is received from the user computing device over a network. In another example embodiment, the application authentication system is within a secure element or other secure memory on the user computing device.

The application authentication system generates a random nonce. In an example embodiment, the random nonce is generated using a cryptographically-secure pseudo-random number generator ("CSPRNG"). The application authentication system generates a current timestamp. For example, the application authentication system saves the date and time corresponding to the session key request.

The application authentication system calculates the session key based at least in part on the request parameters, the random nonce, and the current timestamp. In an example embodiment, the application authentication system uses an algorithm to calculate and/or construct the session key. In another example embodiment, the session key is generated using a cryptographic hash function. The application authentication system transmits the session key and session key parameters to the requesting application. In another example embodiment, the session key parameters enable the application authentication system to recreate the session key upon request from the invited application or from another entity. In another example embodiment, the application authentication system saves the session key in server-side storage.

The requesting application creates a pasteboard. In an example embodiment, the pasteboard is accessible to all applications resident on the user computing device and allows applications to post and/or read posted messages to and from other applications. In another example embodiment, the requesting application creates a name for the pasteboard, and the pasteboard can only be accessed by applications with knowledge of the pasteboard name. The requesting application generates a random challenge. In an example embodiment, the random challenge is generated using a CSPRNG. In an example embodiment, the CSPRNG is resident in the requesting application. In another example embodiment, the CSPRNG is resident on the user computing device and accessible by the requesting application. Other methods for generating a random challenge are suitable.

The requesting application calculates the output of a session key function with the random challenge as input. In an example embodiment, the session key function is pre-programmed into the requesting application program code. The requesting application posts the session key function result on the pasteboard. The requesting application launches the invited application. For example, a merchant application launches a digital wallet application module to initiate a payment transaction. In an example embodiment, only one application on the user computing device may run in the foreground at a time. In this example embodiment, background applications have little processing time whereas the foreground application is able to freely execute on the user computing device. In this example embodiment, to initiate communication with a background application, the foreground application must launch the background application into the foreground. In an example embodiment, when a requesting application launches an invited application into the foreground, the requesting application goes to the background.

The requesting application transmits the session key parameters and the pasteboard name to the invited application. The invited application requests authentication credentials from the user. In an example embodiment, the authentication credentials comprise a user name and a password. In an example embodiment, the user trusts the invited application to collect user credentials. In an example embodiment, the invited application has the user credentials, and the user only has to approve the submission of the user credentials. For example, the background application displays a request for a username and password to the user on the user interface of the user computing device. The request comprises a pre-filled form with the username and password already entered and a user interface object that the user may select to approve the submission of the user name and password. The user initiates an authentication session with the application authentication system by providing the authentication credentials to the invited application.

The invited application transmits a session key request comprising the request parameters and the session key parameters to the application authentication system. In an example embodiment, the invited application comprises a response algorithm that transmits the session key request to the application authentication system in response to receiving the session key parameters from the application. In another example embodiment, the invited application transmits, to the application authentication system, the received authentication credentials in addition to the session key request comprising the session key parameters. The application authentication system verifies that the user is in a valid authentication session. In an example embodiment, the application authentication system manages the invited application and can determine if the user is in a valid authentication session or not. In another example embodiment, the application authentication system transmits an authentication session status request to the invited application concerning the user and receives a response from the invited application as to whether the user has initiated a valid authentication session. In this same example embodiment, the application authentication system may verify the validity of the authentication session by requesting, from the invited application, the authentication credentials entered by the user. In another example embodiment, the application authentication system has already received the user authentication credentials along with the session key request and may verify the received authentication credentials. For example, the application authentication system has a database that comprises a list of the user's authentication credentials and compares the received authentication credentials to the authentication credentials of the user listed on the database. In another example embodiment, the application authentication system does not respond to session key requests from an invited application unless an authentication session has been initiated by the user. In another example embodiment, the authentication session endures until the user requests that the authentication session cease. In another example embodiment, the authentication session endures for a set amount of time after the user provides the authentication credentials.

The application authentication system calculates a second session key based on the request parameters and the session key parameters. In an example embodiment, the application authentication system uses the same algorithm that was used to calculate and/or construct the session key that was used by the requesting application. In another example embodiment, the second session key is generated using the cryptographic hash function. For example, if the session key parameters and the request parameters are the same as those pertaining to the session key created for the requesting application, the calculated second session key is equivalent. In another example, the session key parameters and/or request parameters given to the application authentication system are different from those used to create the session key for the requesting application, therefore the calculated second session key is different. The application authentication system transmits the second session key to the invited application. In another example embodiment, the application authentication system retrieves the session key from the server side storage by providing the request parameters and session key parameters to the server-side storage. For example, the application authentication system can only retrieve the saved session key if the correct parameters are given. In an example embodiment, the server-side storage is within a secure element or other secure memory of the user device.

The invited application accesses the pasteboard. In an example embodiment, the invited application identifies the pasteboard based at least in part on the pasteboard name received from the requesting application. The invited application determines the random challenge using the posted session key function result from the pasteboard and the session key function. In an example embodiment, an algorithm is used to solve for the random challenge. The invited application calculates an expected value based on the second session key and the random challenge. The invited application posts the expected value on the pasteboard. The requesting application confirms the expected value using the session key function. In an example embodiment, the requesting application already has the expected value calculated and stored and only compares this stored value to the expected value posted by the invited application on the pasteboard. In an example embodiment, after the expected value is confirmed, mutual authentication has been established between the requesting application and the invited application. In another example embodiment, further authentication measures are taken to authenticate the invited application. In an example embodiment, after mutual authentication has been established, information is exchanged between the requesting application and the invited application via the pasteboard. For example, if the requesting application is a merchant application and the invited application is the user's digital wallet application, the merchant application can request, via the pasteboard, financial information from the digital wallet application and the digital wallet application can securely send financial information to the merchant application over the pasteboard, encrypted by the session key.

The inventive functionality will be explained in more detail in the following description, read in conjunction with the figures illustrating the program flow.

Example System Architecture

Turning now to the drawings, in which like numerals indicate like (but not necessarily identical) elements throughout the figures, example embodiments are described in detail.

FIG. 1 is a block diagram depicting an inter-application authentication and cryptographic key exchange system, in accordance with certain example embodiments. As depicted in FIG. 1, the example operating environment 100 comprises a user computing device 110 and an application authentication system 130 that are configured to communicate with one another via one or more networks 120. In another example embodiment, these systems (including systems 110 and 130) are integrated into the same system. In some embodiments, a user 101 associated with a device must install an application and/or make a feature selection to obtain the benefits of the techniques described herein.

Each network 120 includes a wired or wireless telecommunication means by which network system (including systems 110 and 130) can communicate and exchange data. For example, each network 120 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

Each network system (including systems 110 and 130) includes a device having a communication module capable of transmitting and receiving data over the network 120. For example, each network system (including systems 110 and 130) can comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 120. In the example embodiment depicted in FIG. 1, the network systems (including systems 110 and 130) are operated by a user 101 and an application authentication system operator, respectively.

The user computing device 110 comprises a user interface 111, a communication application 113, a requesting application 115, an invited application 117, and a data storage unit 119. In an example embodiment, the user computing device 110 may be a personal computer, mobile device (for example, notebook, computer, tablet computer, netbook computer, personal digital assistant (PDA), video game device, GPS locator device, cellular telephone, Smartphone or other mobile device), television, or other appropriate technology that includes or is coupled to a web server, or other suitable application for interacting with web page files.

In an example embodiment, the user interface 111 enables the user 101 to interact with the requesting application 115 and the invited application 117 on the user computing device 110. For example, the user interface 111 may be a touch screen, a web page, a voice based interface, or any other interface, which allows the user 101 to provide input and receive output from the requesting application 115. In an example embodiment, the user interface 111 displays on the user computing device 110 a request from the invited application 117 to the user 101 to enter authentication credentials. In an example embodiment, a user 101 can transmit the authentication credentials to the invited application 117 via the user interface 111.

In an example embodiment, the communication application 113 can interact with web servers or other computing devices connected to the network 120, including the user computing device 110 and the application authentication system 130.

In an example embodiment, the requesting application 115 is a program, function, routine, applet, or similar entity that exists on and performs its operations on the user computing device 110. In some embodiments, the user 101 must install the requesting application 115 and/or make a feature selection on the user computing device 110 to obtain the benefits of the techniques described herein. In an example embodiment, the user 101 may access and interact with the application 115 on the user computing device 110 via the user interface 111. In an example embodiment, the requesting application 115 is capable of launching an invited application 117 using a URL via the user computing device 110 operating system. In this example embodiment, the application 115 is not able to know whether the intended invited application 117 is launched. In an example embodiment, the requesting application 115 can create and name a pasteboard on the user computing device 110 that is accessible to other applications on the user computing device 110 having the pasteboard name. In an example embodiment, the requesting application 115 comprises, has direct access to on the user computing device 110, or has remote access via one or more networks 120 to a cryptographically secure pseudo-random number generator ("CSPRNG") with which the requesting application 115 is capable of generating a random challenge.

In an example embodiment, the invited application 117 is a program, function, routine, applet, or similar entity that exists on and performs its operations on the user computing device 110. In some embodiments, the user 101 must install the invited application 117 and/or make a feature selection on the user computing device 110 to obtain the benefits of the techniques described herein. In an example embodiment, the application 117 is able to be launched by a requesting application 115 using the URL of the application 117. In this example embodiment, the application 117 is provided with the identity of the requesting application 115 by the user computing device 110 operating system. In an example embodiment, the user 101 may interact with the invited application 117 on the user computing device 110 via the user interface 111.

In an example embodiment, the data storage unit 119 comprises any local or remote data storage structure accessible to the user computing device 110 suitable for storing information. In an example embodiment, the data storage unit 119 stores encrypted information, such as HTML5 local storage. In an example embodiment, the data storage unit 119 is used by the requesting application 115 to store a session key or session key parameters received from the application authentication system 130. In an example embodiment, the pasteboard (not shown) created by the requesting application 115 is located in the data storage unit 119.

In an example embodiment, the user computing device 110 communicates with the application authentication system 130. An example application authentication system 130 comprises an application authentication system device 131 and CSPRNG 133. In an example embodiment, the application authentication system device 131 is used by the application authentication system 130 to respond to session key requests. In an example embodiment, the application authentication system device 131 calculates the session key based at least in part on the session key parameters and the request parameters.

In an example embodiment, the CSPRNG 133 is a program, function, routine, applet, or similar entity that exists on and performs its operations on the application authentication system 130 or the application authentication system device 131. In another example embodiment, the CSPRNG 133 is remotely accessible by the application authentication system 130 via a network 120. In an example embodiment, the CSPRNG 133 is used by the application authentication system 130 to calculate a random nonce, which is used to calculate a session key.

In an example embodiment, the application authentication system 130 comprises a data storage unit (not shown). In an example embodiment, the data storage unit comprises any local or remote data storage structure accessible to the user computing device 110 suitable for storing information. In an example embodiment, the data storage unit stores encrypted information, such as HTML5 local storage. In an example embodiment, the data storage unit comprises a server-side storage which stores the session key.

The components of the example-operating environment 100 are described hereinafter with reference to the example methods illustrated in FIGS. 2-6. The example methods of FIGS. 2-6 may also be performed with other systems and in other environments.

Example System Process

Figure 2:
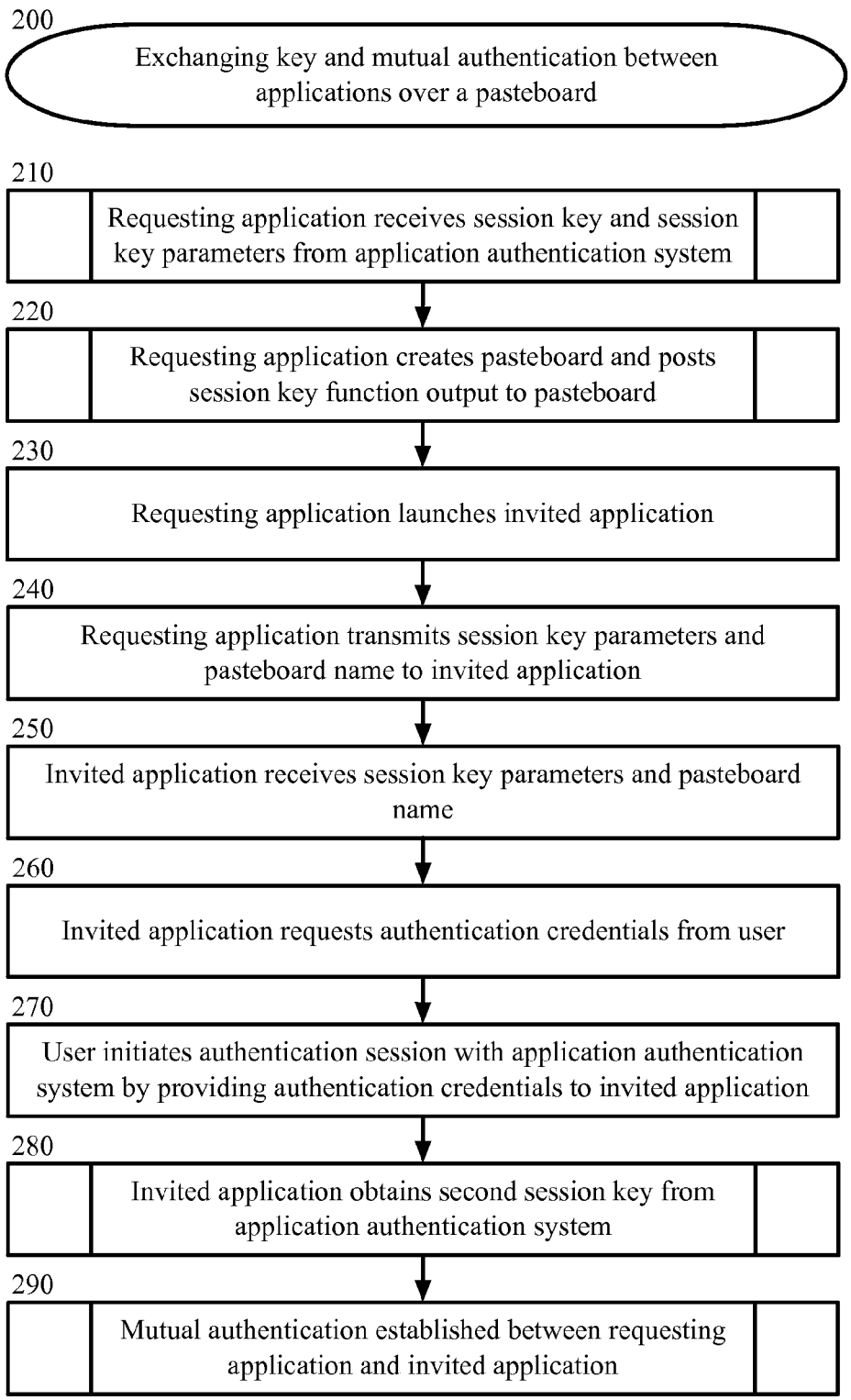
FIG. 2 is a block diagram depicting a method for key exchange and mutual authentication between applications over a pasteboard, in accordance with certain example embodiments.

FIG. 2 is a block flow diagram depicting a method 200 for key exchange and mutual authentication between applications over a pasteboard. The method 200 is described with reference to the components illustrated in FIG. 1.

In block 210, a requesting application 115 receives a session key and session key parameters from an application authentication system 130. In an example embodiment, the requesting application 115 is directed to initiate communication with an invited application 117 and receives the session key to use for establishing secure communication. In an example embodiment, the invited application 117 is managed by the application authentication system 130. For example, the user 101 has an online digital wallet account with the application authentication system 130. In this example, the application authentication system 130 distributes a digital wallet account module onto the user's 101 user computing device 110 which provides the user computing device 110 access to the online digital wallet account. The method for receiving the session key and the session key parameters from the application authentication system 130 is described in more detail hereinafter with reference to the methods described in FIG. 3.

Figure 3:
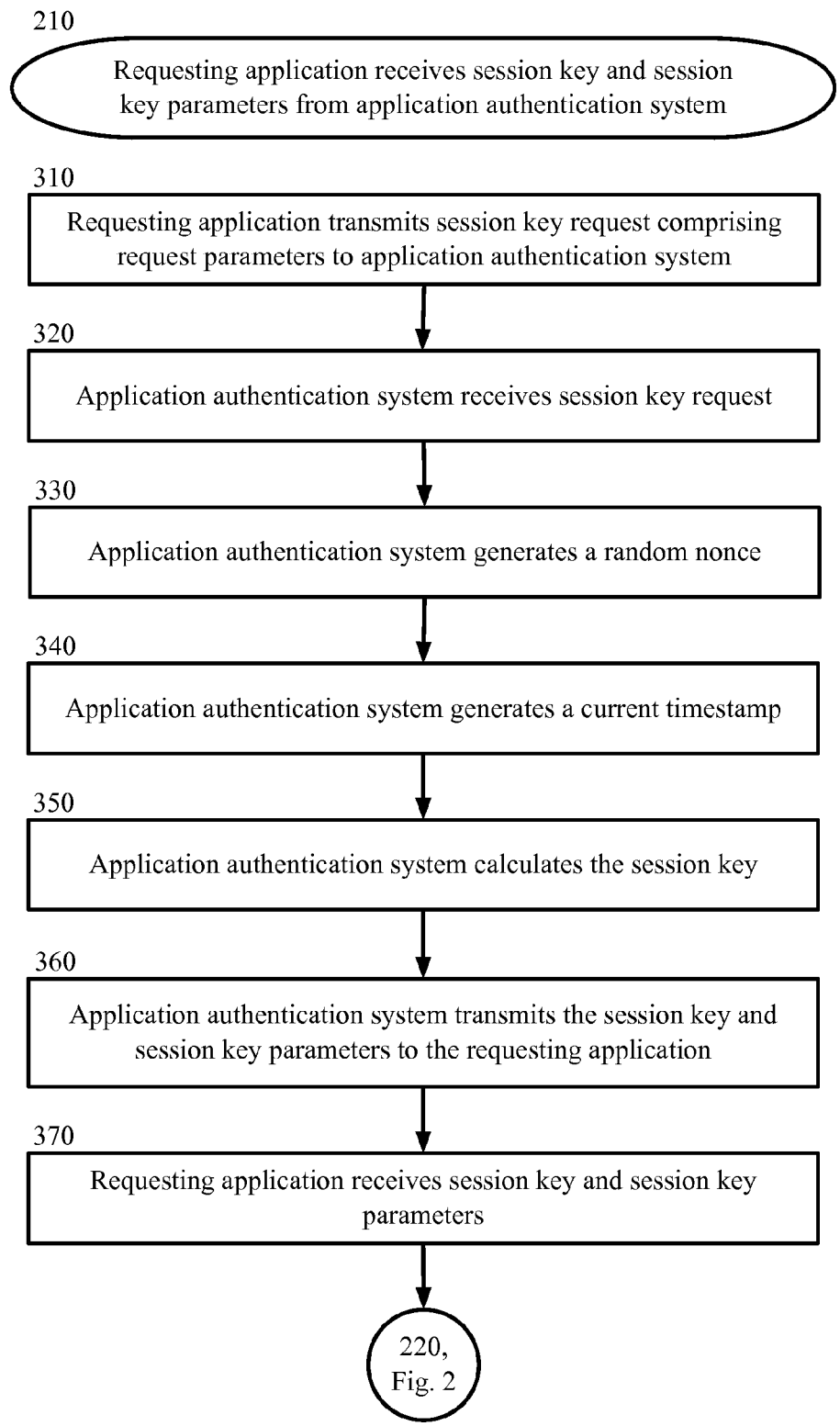
FIG. 3 is a block diagram depicting a method for receiving a session key and session key parameters by a requesting application, in accordance with certain example embodiments.

FIG. 3 is a block flow diagram depicting a method 210 for receiving the session key and the session key parameters by the requesting application 115, in accordance with certain example embodiments, as referenced in block 210 of FIG. 2. The method 210 is described with reference to the components illustrated in FIG. 1.

In block 310, the requesting application 115 transmits a session key request comprising request parameters to the application authentication system 130. In an example embodiment, the request parameters comprise the requesting application 115 name, the invited application 117 name, and a user computing device 110 ID. For example, merchant application named "A" requests a session key from the application authentication system 130 to communicate with a digital wallet application module named "B" on a user computing device 110 named "C." In this same example, request parameters would comprise {A,B,C}.

In another example embodiment, the requesting application 115 generates its own session key and forms a tuple based at least in part the session key, the requesting application 115 name, the invited application 117 name, and a user computing device 110 ID. In this example embodiment, the requesting application 115 encrypts the tuple using the public key of the application authentication system 130.

In block 320, the application authentication system 130 receives the session key request. In an example embodiment, the application authentication system 130 is a remote server and the session key request is received from the user computing device 110 over a network 120. In another example embodiment, the application authentication system 130 is within a secure element (not shown) on the user computing device 110 and the requesting application 115 has authorization to access. For example, the application authentication system 130 comprises an application within the secure element.

In block 330, the application authentication system generates a random nonce. For example, the random nonce is a number to be used to create a session key. In an example embodiment, the random nonce is generated by the CSPRNG 133. Other methods for generating a random nonce are suitable.

In block 340, the application authentication system 130 generates a current timestamp. In an example embodiment, the timestamp is generated at the time the application authentication system 130 receives the session key request. In an example embodiment, the timestamp includes the year, the month, the numerical day of the month, the day of the week, the hour of the day, the minutes, the seconds, the time zone, and/or any other relevant measure of time. In an example embodiment, the timestamp is recorded by the application authentication system device 131.

In block 350, the application authentication system 130 calculates the session key. In an example embodiment, the session key is calculated based at least in part on the request parameters, the random nonce, and the current timestamp. In an example embodiment, the application authentication system 130 uses an algorithm to calculate and/or construct the session key. In an example embodiment, the session key is a cryptographic hash generated using a cryptographic hash function. In another example embodiment, the session key is generated using the CSPRNG 133 and a tuple is generated by the application authentication system 130 based at least in part the session key, the requesting application 115 name, the invited application 117 name, the user computing device 110 ID, and a timestamp generated by the requesting application 115. For example, the tuple is an ordered list of the above information. Other means for generating the session key are suitable.

In block 360, the application authentication system 130 transmits the session key and session key parameters to the requesting application 115. In an example embodiment, the session key parameters enable the application authentication system 130 to re-create the session key upon request from the invited application 117 or from another entity. For example, the session key parameters may comprise the current timestamp, the random nonce and the invited application's 117 key ID. In another example embodiment, the application authentication system 130 saves the session key in server-side storage and transmits only the session key parameters to the requesting application 115. In yet another example embodiment, the application authentication system 130 transmits the invited application's 117 keypair ID, a current timestamp, and the tuple. For example, the keypair is the public and private key set, the keypair ID is the name of the public key, and the tuple is the ordered list based at least in part on the session key, the requesting application 115 name, the invited application 117 name, the user computing device 110 ID, and the timestamp generated by the requesting application 115.

In block 370, the requesting application 115 receives the session key and the session key parameters.

The method 210 then proceeds to block 220 in FIG. 2.

Returning to FIG. 2, in block 220, the requesting application 115 creates a pasteboard and posts a session key function output to the pasteboard. The method for posting a session key function output to a pasteboard is described in more detail hereinafter with reference to the methods described in FIG. 4.

Figure 4:
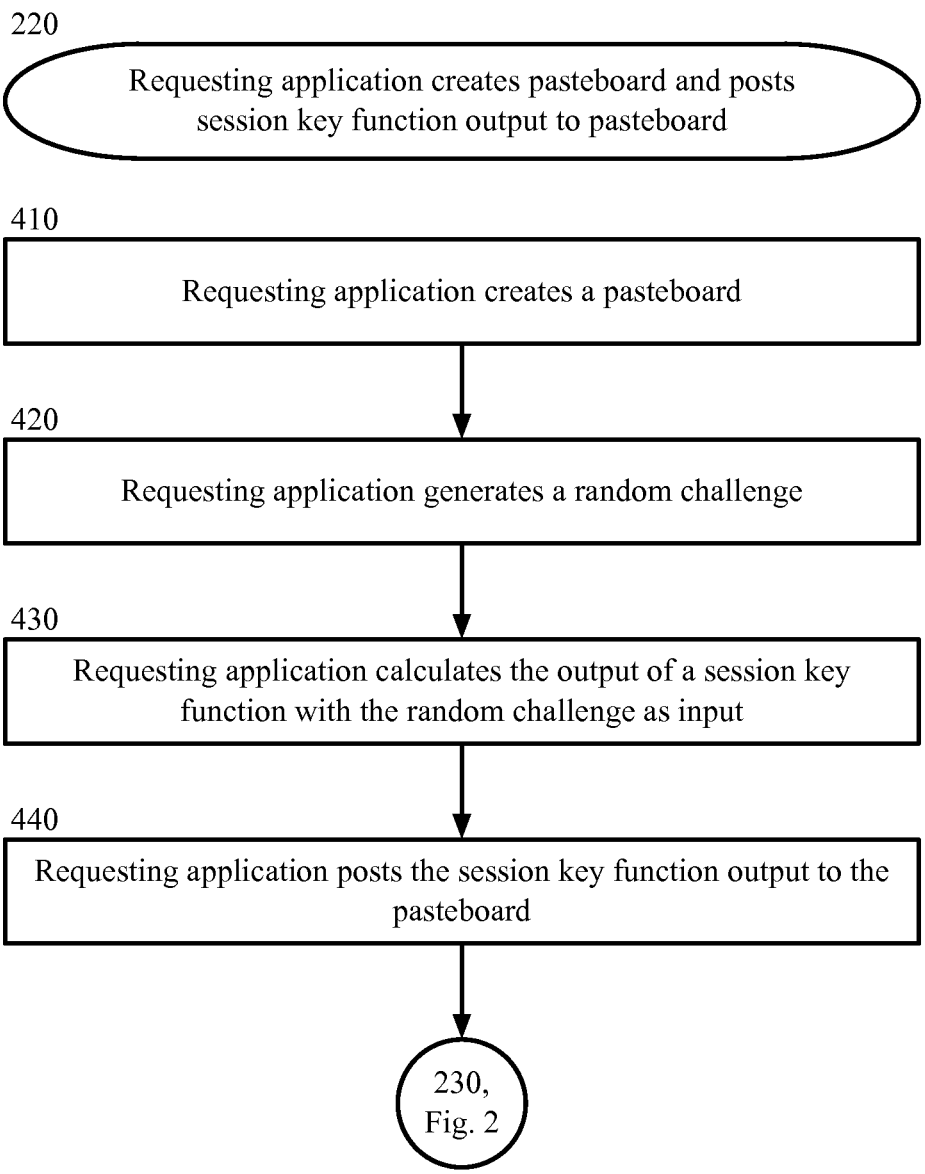
FIG. 4 is a block diagram depicting a method for creating a pasteboard and posting a session key function output to the pasteboard, in accordance with certain example embodiments.

FIG. 4 is a block flow diagram depicting a method 220 for posting a session key function output to a pasteboard, in accordance with certain example embodiments, as referenced in block 220 of FIG. 2. The method 220 is described with reference to the components illustrated in FIG. 1.

In block 410, the requesting application 115 creates a pasteboard. In an example embodiment, the pasteboard is given a name with which it can be located and accessed by applications on the user computing device 110. In an example embodiment, the pasteboard is accessible to all applications resident on the user computing device 110 and allows applications to post messages to other applications and read messages posted by other applications.

In block 420, the requesting application 115 generates a random challenge. In an example embodiment, the random challenge is generated using a CSPRNG (not shown). Other methods for generating a random nonce are suitable. For example, the random challenge is a random integer number that, if an invited application 117 provides correctly, can be used by the requesting application 115 to confirm the identity of the invited application 117. In an example embodiment, the requesting application 115 comprises the CSPRNG. In another example embodiment, the CSPRNG is resident on the user computing device 110. In yet another example embodiment, the requesting application 115 accesses the CSPRNG remotely via the network 120 to generate the random challenge.

In block 430, the requesting application 115 calculates the output of a session key function with the random challenge as input. In an example embodiment, both the invited application 117 and the requesting application 115 have this session key function.

In block 440, the requesting application 115 posts the session key function output to the pasteboard.

The method 220 then proceeds to block 230 in FIG. 2.

Returning to FIG. 2, in block 230, the requesting application 115 launches the invited application 117. In an example embodiment the requesting application 115 launches the invited application 117 using the URL of the invited application 117. In an example embodiment, the requesting application 115 does not have certainty that the invited application 117 has a unique URL on the user computing device 110. In another example embodiment, an unintended application (not shown) is launched instead of the invited application 117. In this example embodiment, the requesting application 115 did not intend to initiate communication with this other application.

In block 240, the requesting application 115 transmits the session key parameters and the pasteboard name to the invited application 117. In an example embodiment, requesting application 115 transmits the session key parameters and pasteboard name as URL parameters to the invited application 117 when launching via URL.

In block 250, the invited application 117 receives the session key parameters and the pasteboard name. In another example embodiment, the unintended application (not shown) with the same URL as the invited application 117 receives the session key parameters.

In block 260, the invited application 117 requests authentication credentials from the user 101. For example, the identification credentials may comprise a username and a password that the user 101 is accustomed to using to login to the invited application 117.

In another example, the authentication credentials comprise information from the user 101 that the application authentication system 130 can match to a database. Any other authentication credential exchange may be utilized.

In block 270, the user initiates an authentication session with the application authentication system 130 by providing the authentication credentials to the invited application 117. In an example embodiment, the application authentication system 130 or the invited application 117 verifies the authentication credentials to complete the initiation of the authentication session. In an example, providing the authentication credentials to the invited application 117 comprises the user 101 logging in to the invited application 117.

In block 280, the invited application 117 obtains a second session key from the application authentication system 130. The method for obtaining a second session key from the application authentication system 130 is described in more detail hereinafter with reference to the methods described in FIG. 5.

Figure 5:
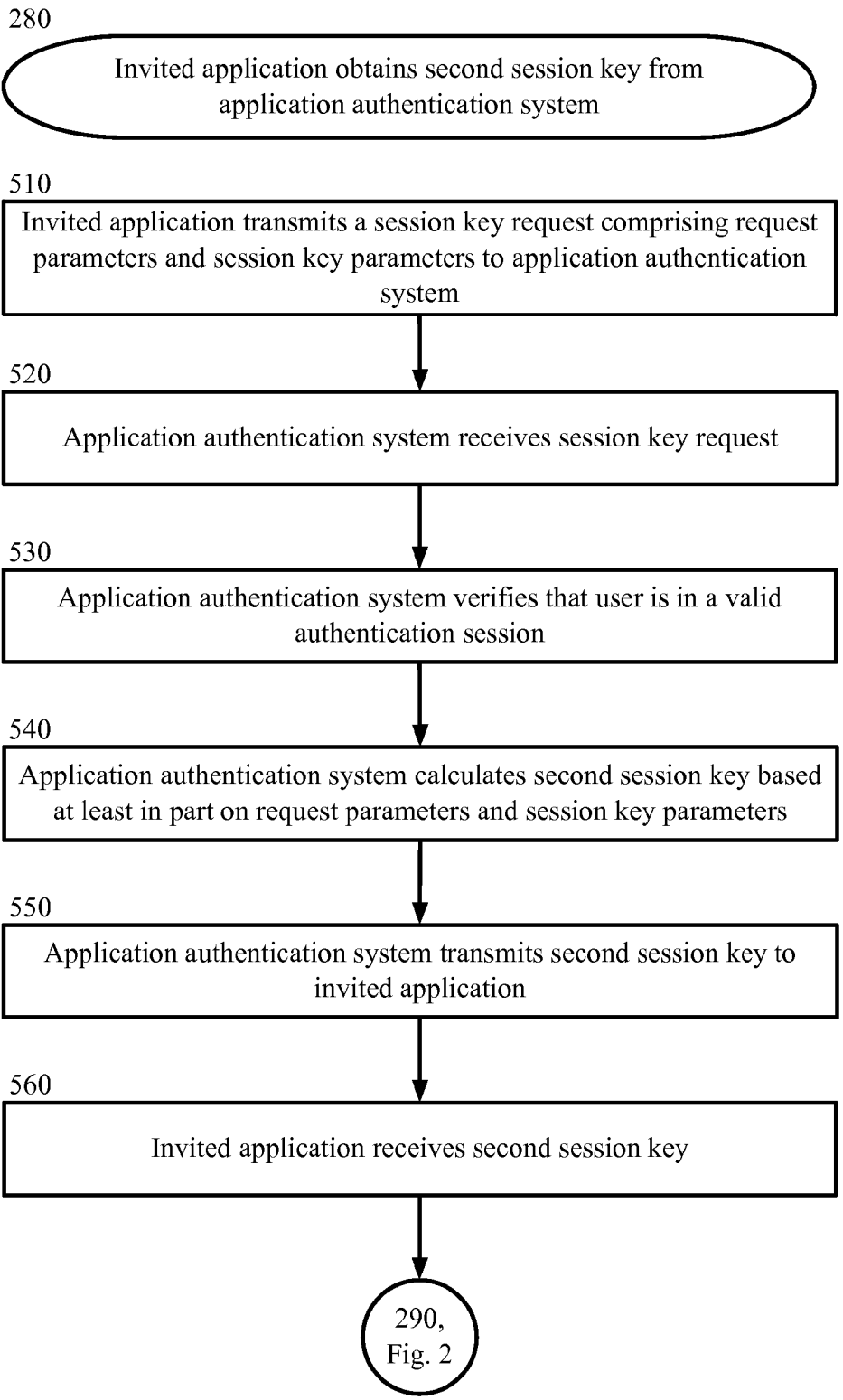
FIG. 5 is a block diagram depicting a method for obtaining a second session key from the application authentication system, in accordance with certain example embodiments.

FIG. 5 is a block flow diagram depicting a method 280 for obtaining a second session key from the application authentication system 130, in accordance with certain example embodiments, as referenced in block 280 of FIG. 2. The method 280 is described with reference to the components illustrated in FIG. 1.

In block 510, the invited application 117 transmits a session key request comprising request parameters and the session key parameters to the application authentication system 130. In an example embodiment, the request parameters comprise the requesting application 115 name, the invited application 117 name, the user computing device 110 ID, and the session key parameters received from the requesting application 115. For example, the session key parameters may comprise the random nonce, the current timestamp, and the invited application's 117 key ID. In another example embodiment, the invited application 117 requests the application authentication system 130 to decrypt the session key received from the requesting application 115 by providing the tuple and request parameters comprising the name of the requesting application 115, the invited application 117 name, the user computing device 110 ID, the current timestamp, the invited application's 117 keypair ID, and a timestamp generated by the invited application 117. In yet another example embodiment, the invited application 117 requests the application authentication system 130 to retrieve the session key from server-side storage by providing the request parameters and the session key parameters. In another example embodiment, the invited application 117 transmits, to the application authentication system, the received authentication credentials in addition to the session key request comprising the session key parameters and the request parameters.

In block 520, the application authentication system 130 receives the session key request.

In block 530, the application authentication system 130 verifies that the user 101 is in a valid authentication session. In an example embodiment, the application authentication system 130 verifies the user's 101 authentication credentials that were received by the invited application 117. In this same example embodiment, the application authentication system 130 manages the invited application 117 and can determine if the user 101 is in a valid authentication session or not. In another example embodiment, the application authentication system 130 verifies that the user 101 is logged in to the invited application 117. In an example embodiment, the application authentication system 130 transmits an authentication session status request to the invited application 117 concerning the user 101 and receives a response from the invited application 117 as to whether the user 101 has initiated a valid authentication session. In this same example embodiment, the application authentication system 130 may verify the validity of the authentication session by requesting, from the invited application 117, the authentication credentials entered by the user 101. In another example embodiment, the application authentication system 130 has already received the user 101 authentication credentials along with the session key request and may verify the received authentication credentials. For example, the application authentication system 130 has a database that comprises a list of the user's 101 authentication credentials and compares the received authentication credentials to the authentication credentials of the user 101 listed on the database.

In block 540, the application authentication system 130 calculates a second session key based at least in part on the request parameters and the session key parameters. In an example embodiment, the application authentication system 130 calculates the session key based at least in part on the request parameters and the session key parameters. For example, the application authentication system 130 uses an algorithm to calculate and/or construct the session key. In another example, the session key is a cryptographic hash generated using a cryptographic hash function. In another example embodiment, the application authentication system 130 decrypts the tuple, verifies that the timestamp generated by the requesting application 115 and the timestamp generated by the invited application 117 are not too different, and verifies the requesting application 115 and invited application 117 names and the device ID name from the tuple are the same as application names and device ID name in the request parameters. In yet another example embodiment, the application authentication system 130 finds the session key from server-side storage using the tuple.

In block 550, the application authentication system 130 transmits the second session key to the invited application 117. For example, if the requesting application 115 launched the invited application 117 (and not an unintended application), the second session key is the same as the session key.

In block 560, the invited application 117 receives the second session key.

The method 280 then proceeds to block 290 in FIG. 2.

Returning to FIG. 2, in block 290, mutual authentication is established between the requesting application 115 and the invited application 117. The method for establishing mutual authentication between the requesting application 115 and the invited application 117 is described in more detail hereinafter with reference to the methods described in FIG. 6.

Figure 6:
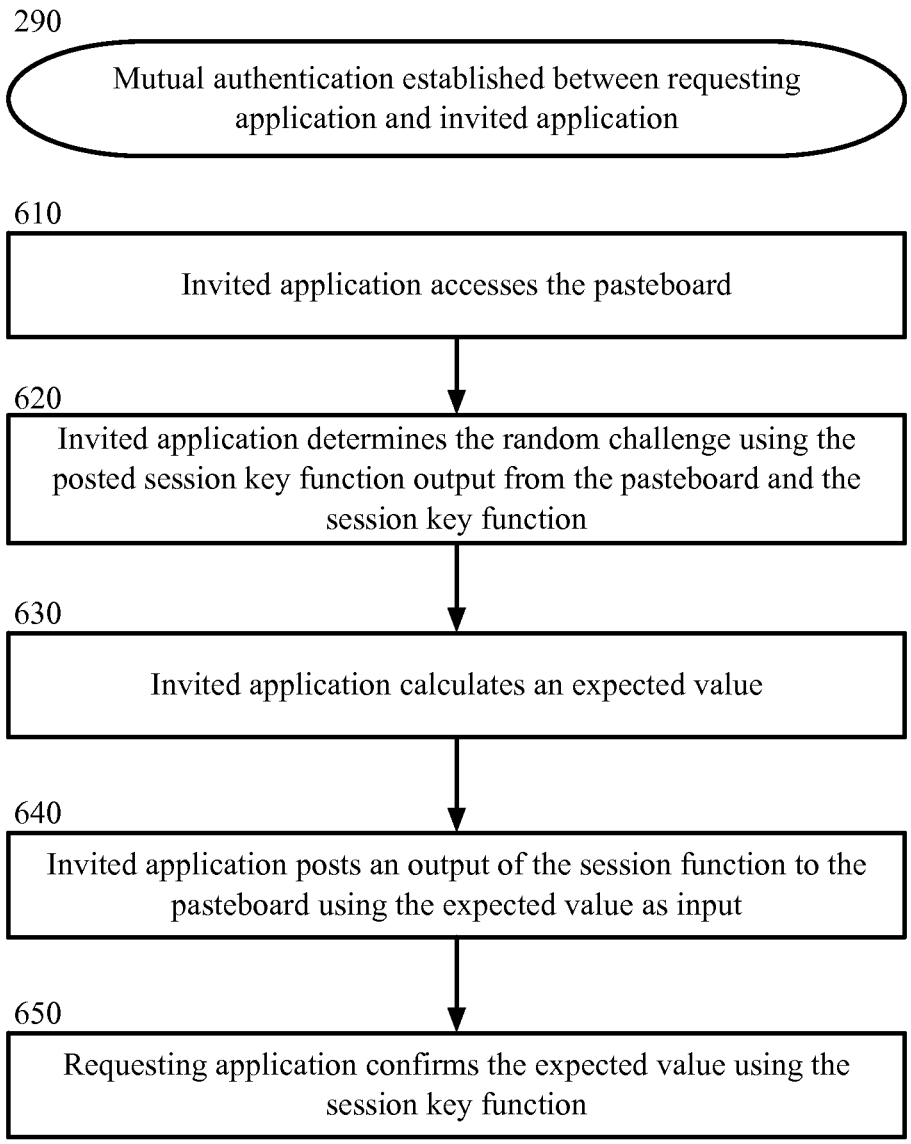
FIG. 6 is a block diagram depicting a method for establishing mutual authentication between the requesting application and the invited application, in accordance with certain example embodiments.

FIG. 6 is a block flow diagram depicting a method 290 for establishing mutual authentication between the requesting application 115 and the invited application 117, in accordance with certain example embodiments, as referenced in block 290 of FIG. 2. The method 290 is described with reference to the components illustrated in FIG. 1.

In block 610, the invited application 117 accesses the pasteboard. In an example embodiment, the invited application 117 accesses the pasteboard by issuing a call using the pasteboard name received from the requesting application 115.

In block 620, the invited application 117 determines the random challenge using the posted session key function output from the pasteboard and the session key function. For example, if the random challenge is a random integer N, the session key function is a function based at least in part on N, and the invited application 117 has the same session key function used by the requesting application 115 to create and post the session key function output, then the invited application 117 can solve for or determine the random challenge.

In block 630, the invited application 117 calculates an expected value based on the second session key and the random challenge. In an example embodiment, both the requesting application 115 and the invited application 117 have access to a standard equation that is used to determine a random challenge. In this same example embodiment, the expected value is based on the random challenge and would be recognizable by the requesting application 115 as deriving from the random challenge. For example, the expected value may be an integer value of one less than the random challenge.

In block 640, the invited application 117 posts an output of the session key function using the expected value as the input to the pasteboard. In an example embodiment, this session key function output is posted in the same format and derived in the same manner as the session key function output previously posted to the pasteboard by the requesting application 115. For example, the expected value is one integer value less than the random challenge. In this same example, the invited application 117 derives the output of the second session key function using the same equation or format as used by the requesting application 115 when deriving the output of the first session key function, except that the expected value is used instead of the random challenge.

In block 650, the requesting application 115 confirms the expected value using the session key function. In an example embodiment, the requesting application 115 derives the expected value using the same function that it used to determine the output that it previously posted to the pasteboard. In an example embodiment, the requesting application 115 calculates an expected value based on the first session key function and compares this to the expected value derived from the output posted by the requesting application 115, which is based on the second session key function. For example, if both expected value are the same, then the requesting application 115 realizes that both applications have the same session key. In an example embodiment, the requesting application 115 can now securely send and receive messages from the invited application 117. For example, the requesting application 115 can send and receive messages from the invited application 117 via the pasteboard, encrypting and decrypting the messages using the shared session key function. For example, financial information can be sent securely from the invited application 117 to the requesting application 115 through encryption.

Other Example Embodiments

Figure 7:
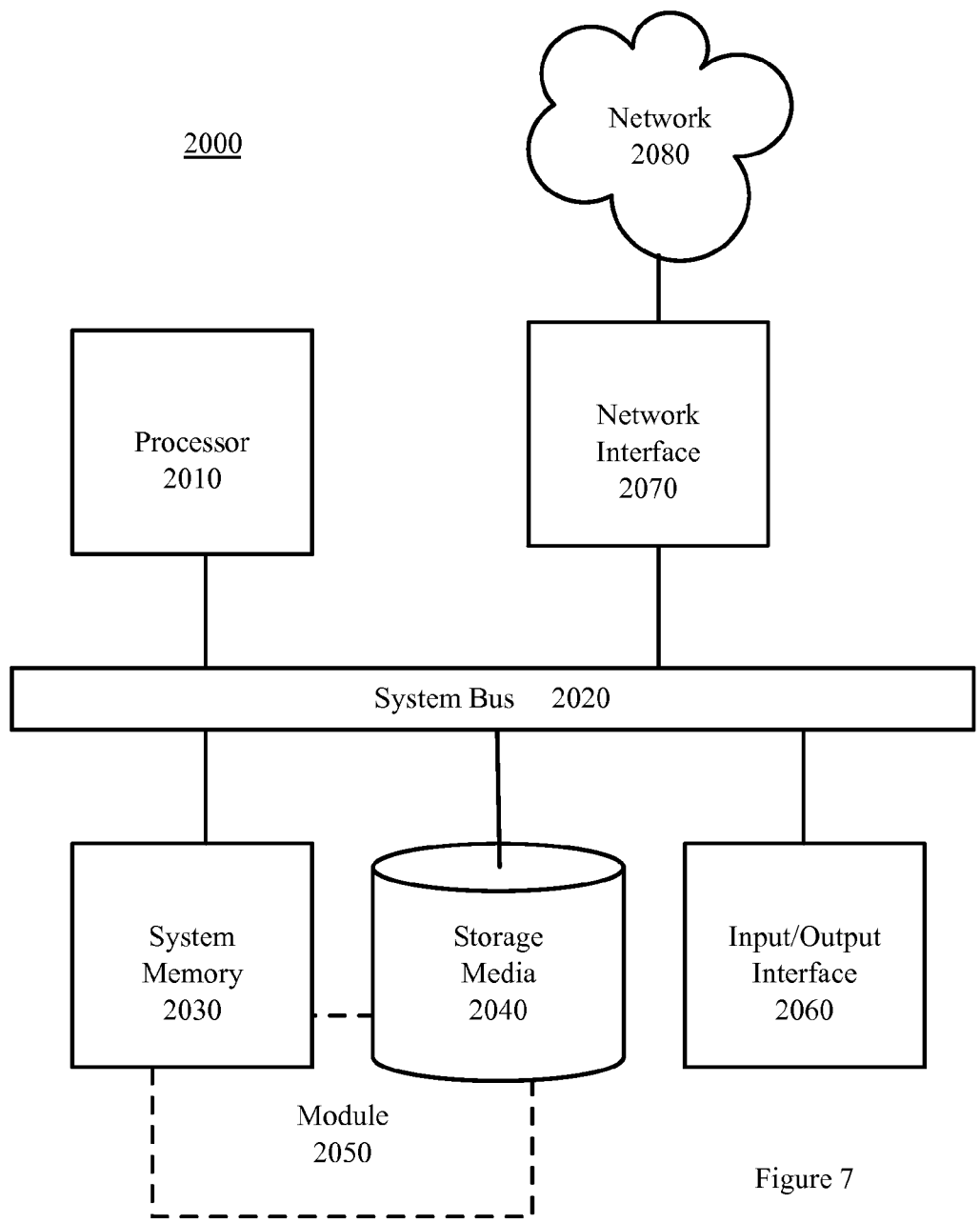
FIG. 7 is a block diagram depicting a computer machine and module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for establishing mutual authentication and cryptographic key exchange for communications between service applications on user computing devices, comprising:

obtaining, by a first service application on a user computing device, a session key and session key parameters, the session key parameters being usable by one or more computing devices to provide the session key;

creating, by the first service application on the user computing device, a pasteboard on the computing device comprising a pasteboard name, wherein the pasteboard is accessible to read and post information by any service application on the computing device possessing the pasteboard name;

generating, by the first service application on the user computing device, a random challenge;

determining, by the first service application on the user computing device, one or more outputs of session key functions with the random challenge as input;

posting, by the first service application on the user computing device, the one or more outputs of the session key functions to the pasteboard;

launching, by the first service application on the user computing device, a second service application on the computing device, wherein the second service application is an application on the computing device, is managed by the one or more computing devices, and is trusted by a user of the computing device to collect user credentials;

transmitting, by the first service application on the user computing device, the session key parameters and the pasteboard name to the second service application, wherein the second service application requests authentication credentials from the user of the computing device to initiate an authentication session with the one or more computing devices;

receiving, by the one or more computing devices, a session key retrieval request from the second service application on the computing device;

verifying, by the one or more computing devices, that the user has initiated the authentication session;

providing, by the one or more computing devices, the session key to the second service application on the computing device, wherein the second service application verifies the one or more outputs of the session key functions on the pasteboard and solves for the random challenge, wherein the second service application calculates one or more expected values of the session key functions based at least in part on the random challenge, and wherein the second service application posts one or more outputs of the session function to the pasteboard with the one or more expected values as input;

verifying, by the first service application on the user computing device, the one or more outputs posted to the pasteboard by the second service application; and communicating, by the first service application on the user computing device, with the second service application on the computing device.

2. The method of claim 1, wherein obtaining the session key and the session key parameters comprises:

transmitting, by the first service application on the computing device, the session key request comprising request parameters to the one or more computing devices, the request parameters comprising the first service application name, the second service application name, and the computing device ID;

receiving, by the first service application on the computing device and from the one or more computing devices, the session key, wherein the one or more computing devices generate a random nonce and a current timestamp and wherein the one or more computing devices generate the session key based at least in part on the request parameters, the random nonce, and the current timestamp; and receiving, by the first service application on the computing device and from the one or more computing devices, the session key parameters.

3. The method of claim 2, wherein the session key retrieval request comprises the session key parameters and wherein providing the session key to the second service application comprises generating the session key based at least in part on the session key parameters.

4. The method of claim 1, wherein obtaining the session key and the session key parameters comprises:
generating, by the first service application on the computing device, the session key;
generating, by the first service application on the computing device, the session key parameters; and
encrypting, by the first service application on the computing device, the session key parameters using a public key associated with the one or more computing devices.

5. The method of claim 4, wherein the session key retrieval request comprises the encrypted session key parameters and wherein providing the session key to the second service application comprises:
decrypting, by the one or more computing devices, the encrypted session key parameters; and
generating, by the one or more computing devices, the session key based at least in part on the session key parameters.

6. The method of claim 1, wherein obtaining the session key and the session key parameters comprises:
transmitting, by the first service application on the computing device, the session key request comprising request parameters to the one or more computing devices, the request parameters comprising the first service application name, a second service application name, and the computing device ID;
generating, by the one or more computing devices, a random nonce and a current timestamp;
generating, by the one or more computing devices, the session key based at least in part on the request parameters, the random nonce, and the current timestamp;
generating, by the one or more computing devices, the session key parameters;
storing, by the one or more computing devices, the session key in a server-side storage; and
transmitting, by the one or more computing devices, the session key parameters to the first service application on the user computing device.

7. The method of claim 6, wherein the session key retrieval request comprises the session key parameters and wherein providing the session key to the second service application comprises:
retrieving, by the one or more computing devices, the session key from the server-side storage; and
transmitting, by the one or more computing devise, the session key to the second service application on the user computing device.

8. The method of claim 1, wherein the random challenge is generated via a cryptographically secure pseudo-random number generator (CSPRNG).

9. The method of claim 1, wherein the first service application launches the second service application by publishing a URL scheme.

10. A computer program product, comprising:
a non-transitory computer-readable medium having computer-readable program instructions embodied thereon that when executed by a computer cause the computer to establish mutual authentication and cryptographic key exchange for communications between service applications on user computing devices, the computer-readable program instructions comprising:
computer-readable program instructions for obtaining a session key and session key parameters, the session key parameters being usable by one or more computing devices to provide the session key;
computer-readable program instructions for creating a pasteboard on the computing device comprising a pasteboard name, wherein the pasteboard is accessible to read an post information by any service application on the computing device possessing the pasteboard name;
computer-readable program instructions for generating a random challenge;
computer-readable program instructions for determining one or more outputs of session key functions with the random challenge as input;
computer-readable program instructions for posting the one or more outputs of the session key functions to the pasteboard;
computer-readable program instructions for launching a second service application on the computing device, wherein the second service application is an application on the computing device, is managed by the one or more computing devices, and is trusted by a user of the computing device to collect user credentials;
computer-readable program instructions for transmitting the session key parameters and the pasteboard name to the second service application, wherein the second service application requests authentication credentials from the user of the computing device to initiate an authentication session with the one or more computing devices, and wherein the one or more computing devices receives a session key retrieval request from the second service application, verifies that the user has initiated an authentication session, and provides the session key to the second service application;
computer-readable program instructions for verifying one or more outputs of the session function posted to the pasteboard with one or more expected values as input; and
computer-readable program instructions for communicating with the second service application.

11. The computer program product of claim 10, wherein, at a time after receiving the session key from the one or more computing devices, the second service application verifies the one or more outputs of the session key functions on the pasteboard, solves for the random challenge, calculates one or more expected values, and posts one or more outputs of the session function to the pasteboard with the one or more expected values as input.

12. The computer program product of claim 10, wherein obtaining the session key and the session key parameters comprises:
transmitting session key request comprising request parameters to the one or more computing devices, the request parameters comprising the first service application name, a second service application name, and the computing device ID;

receiving from the one or more computing devices, the session key, wherein the one or more computing devices generate a random nonce and a current timestamp and wherein the one or more computing devices generate the session key based at least in part on the request parameters, the random nonce, and the current timestamp; and receiving, from the one or more computing devices, the session key parameters.

13. The computer program product of claim 12, wherein the session key retrieval request comprises the session key parameters and wherein providing the session key to the second service application comprises generating the session key based at least in part on the session key parameters.

14. The computer program product of claim 10, wherein obtaining the session key and the session key parameters comprises:

generating, by the first service application on the computing device, the session key;

generating, by the first service application on the computing device, the session key parameters; and encrypting, by the first service application on the computing device, the session key parameters using a public key associated with the one or more computing devices.

15. The computer program product of claim 14, wherein the session key retrieval request comprises the encrypted session key parameters and wherein providing the session key to the second service application comprises:

decrypting, by the one or more computing devices, the encrypted session key parameters; and generating, by the one or more computing devices, the session key based at least in part on the session key parameters.

16. A system for establishing mutual authentication and cryptographic key exchange for communications between service applications on user computing devices, the system comprising:

a storage device; and a processor communicatively coupled to the storage device, wherein the processor executes application code instructions that are stored in the storage device to cause the system to:

receive a request for a session key from a second service application on a computing device, wherein the second service application on the computing device is trusted by a user of the computing device to collect user credentials, wherein the second service application on the computing device is launched by a first service application on the computing device, wherein the second service application on the computing device receives one or more session key parameters and a name of a pasteboard generated by the first service application from the first service application on the computing device, and wherein the second service application on the computing device requests authentication credentials from the user of the computing device to initiate an authentication session;

verify the authentication session is initiated; and provide the session key to the second service application on the computing device, wherein the second service application verifies the one or more outputs of one or more session key functions on the pasteboard, solves for a random challenge generated by the first service application, calculates one or more expected values, and posts one or more outputs of the session function to the pasteboard with the one or more expected values as input, and wherein the second service application on the computing device exchanges information with the first service application on the computing device upon a verification of the one or more outputs of the session function posted by the first service application.

17. The system of claim 16, wherein the processor is further configured to execute computer-executable instructions stored in the storage medium to cause the system to:

receive, from the first service application on the computing device, the session key request comprising request parameters, the request parameters comprising the first service application name, the second service application name, and the computing device ID;

generate a random nonce and a current timestamp;

generate the session key based at least in part on the request parameters, the random nonce, and the current timestamp;

generate session key parameters; and transmit the session key and the session key parameters to the first service application on the computing device.

18. The system of claim 17, wherein the session key retrieval request comprises the session key parameters and wherein providing the session key to the second service application comprises generating the session key based at least in part on the session key parameters.

19. The system of claim 16, wherein the processor is further configured to execute computer-executable instructions stored in the storage medium to cause the system to:

receive, from the first service application on the computing device, the session key request comprising request parameters to the one or more computing devices, the request parameters comprising the first service application name, the second service application name, and the computing device ID;

generate a random nonce and a current timestamp;

generate the session key based at least in part on the request parameters, the random nonce, and the current timestamp;

generate the session key parameters;

store the session key in a server-side storage; and transmit the session key parameters to the first service application on the user computing device.

20. The system of claim 19, wherein the session key retrieval request comprises the session key parameters and wherein providing the session key to the second service application comprises:

retrieving the session key from the server-side storage; and transmitting the session key to the second service application on the user computing device.

* * * * *